US007317382B2

(12) United States Patent
Pratt et al.

(10) Patent No.: US 7,317,382 B2
(45) Date of Patent: Jan. 8, 2008

(54) REMOTE COMMUNICATIONS DEVICES, WIRELESS COMMUNICATIONS SYSTEMS, AND WIRELESS COMMUNICATIONS METHODS (75) Inventors: Richard M. Pratt, Richland, WA (US);
Jeffrey Wayne Scott, Pasco, WA (US);
Michael A. Hughes, Pasco, WA (US);
Michael A. Lind, Kent, WA (US);
Gary B. Morgan, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 191 days.

(21) Appl. No.: 11/011,316

(22) Filed: Dec. 13, 2004

(65) Prior Publication Data

US 2006/0139168 A1    Jun. 29, 2006

(51) Int. Cl.
*B60Q 25/10*    (2006.01)
(52) U.S. Cl. .............. 340/428; 340/447; 340/442; 340/445; 340/572.1; 340/572.4; 340/572.8; 73/146.5; 73/756
(58) Field of Classification Search .......... 340/428, 340/572.1, 572.4, 572.8, 10.4, 447, 445, 340/442; 73/146.5, 756
See application file for complete search history.

(56) References Cited

U.S. PATENT DOCUMENTS

| | | | |
|---|---|---|---|
| 5,097,253 A | 3/1992 | Eschbach et al. | |
| 5,541,604 A | 7/1996 | Meier | |
| 5,745,049 A | 4/1998 | Akiyama et al. | |
| 5,854,994 A | 12/1998 | Canada et al. | |
| 5,907,491 A | 5/1999 | Canada et al. | |
| 6,023,610 A | 2/2000 | Wood, Jr. | |
| 6,025,783 A | 2/2000 | Steffens, Jr. | |
| 6,084,522 A | 7/2000 | Addy | |
| 6,486,780 B1 | 11/2002 | Garber et al. | |
| 6,525,648 B1 | 2/2003 | Kubler et al. | |
| 6,557,238 B1 | 5/2003 | Becherucci et al. | |
| 6,566,997 B1 | 5/2003 | Bradin | |
| 6,738,025 B2 | 5/2004 | Carrender | |

(Continued)

FOREIGN PATENT DOCUMENTS

DE    102 05 936 A1    8/2003

(Continued)

OTHER PUBLICATIONS

PCT/US2005/044644 "International Search Report", "Written Opinion"; mailed Mar. 24, 2006; 10 pps.

(Continued)

*Primary Examiner*—Tai Nguyen
(74) *Attorney, Agent, or Firm*—Wells St. John, P.S.

(57) ABSTRACT

Remote communications devices, wireless communications systems, and wireless communications methods are described. In one aspect, a remote communications device includes communication circuitry configured to communicate wireless communication signals externally of the remote communications device, sensor circuitry configured to sense at least one condition with respect to the remote communications device, and wherein the communication circuitry is coupled with the sensor circuitry and is configured to determine a plurality of different moments in time responsive to criteria originating within the remote communications device and to communicate data indicative of the at least one sensed condition externally of the remote communications device to a reader using the wireless communication signals at the different moments in time.

53 Claims, 3 Drawing Sheets

U.S. PATENT DOCUMENTS

| | | |
|---|---|---|
| 6,745,008 B1 | 6/2004 | Carrender et al. |
| 6,765,476 B2 | 7/2004 | Steele et al. |
| 6,806,808 B1 * | 10/2004 | Watters et al. ........... 340/10.41 |
| 6,842,106 B2 | 1/2005 | Hughes et al. |
| 6,861,950 B2 * | 3/2005 | Katou ........................ 340/447 |
| 6,868,073 B1 | 3/2005 | Carrender |
| 6,870,461 B2 | 3/2005 | Fischer et al. |
| 6,914,528 B2 | 7/2005 | Pratt et al. |
| 6,919,807 B2 | 7/2005 | Shek et al. |
| 6,934,540 B2 | 8/2005 | Twitchell, Jr. |
| 6,937,144 B2 * | 8/2005 | Drake et al. ................. 340/447 |
| 6,995,652 B2 | 2/2006 | Carrender et al. |
| 6,995,655 B2 | 2/2006 | Ertin et al. |
| 7,009,495 B2 | 3/2006 | Hughes et al. |
| 7,009,515 B2 | 3/2006 | Carrender |
| 7,009,526 B2 | 3/2006 | Hughes et al. |
| 7,019,617 B2 | 3/2006 | Pratt et al. |
| 7,019,618 B2 | 3/2006 | Pratt et al. |
| 7,030,761 B2 | 4/2006 | Bridgelall et al. |
| 7,042,357 B2 | 5/2006 | Girvin et al. |
| 7,215,976 B2 | 5/2007 | Bridgelall |
| 2004/0066752 A1 | 4/2004 | Hughes et al. |
| 2004/0067764 A1 | 4/2004 | Pratt et al. |
| 2004/0113790 A1 | 6/2004 | Hamel et al. |
| 2005/0248438 A1 * | 11/2005 | Hughes et al. ............. 340/10.4 |

FOREIGN PATENT DOCUMENTS

| | | |
|---|---|---|
| EP | 1 326 202 A2 | 7/2003 |

OTHER PUBLICATIONS

U.S. Appl. No.: 09/589,001, filed Jun. 6, 2000; R.W. Gilbert et al.; Remote Communication System and Method; now abandoned.

U.S. Appl. No.: 09/588,997; filed Jun. 6, 2000; R.W. Gilbert et al.; "Phase Modulation in RF Tag"; now abandoned.

* cited by examiner

FIG. 3B

REMOTE COMMUNICATIONS DEVICES, WIRELESS COMMUNICATIONS SYSTEMS, AND WIRELESS COMMUNICATIONS METHODS

TECHNICAL FIELD

This invention relates to remote communications devices, wireless communications systems, and wireless communications methods.

BACKGROUND OF THE INVENTION

Remote wireless communications may be implemented using radio frequency (RF) technology. Exemplary applications utilizing RF technology include identification applications including, for example, locating, identifying, and tracking of objects. Radio frequency identification device (RFID) systems may be utilized to facilitate identification operations. For example, one device may be arranged to output and receive radio frequency communications and one or more remotely located device may be configured to communicate with the one device using radio frequency communications. The remotely located device(s) may be referred to as a tag, while the other device may be referred to as a reader. Some advantages of radio frequency communications of exemplary radio frequency identification device systems include an ability to communicate without contact or line-of-sight, at relatively fast speeds, and with robust communication channels.

BRIEF DESCRIPTION OF THE DRAWINGS

Preferred embodiments of the invention are described below with reference to the following accompanying drawings.

FIG. 3 is a map illustrating how FIGS. 3A-3B are to be assembled.

DETAILED DESCRIPTION OF THE PREFERRED EMBODIMENTS

According to one aspect of the invention, a remote communications device comprises communication circuitry configured to communicate wireless communication signals externally of the remote communications device, sensor circuitry configured to sense at least one condition with respect to the remote communications device, and wherein the communication circuitry is coupled with the sensor circuitry and is configured to determine a plurality of different moments in time responsive to criteria originating within the remote communications device and to communicate data indicative of the at least one sensed condition externally of the remote communications device to a reader using the wireless communication signals at the different moments in time.

According to another aspect of the invention, a remote communications device comprises communication circuitry configured to communicate wireless communication signals externally of the remote communications device, sensor circuitry configured to sense at least one condition of an environment of the remote communications device and to generate data indicative of the at least one sensed condition, and wherein the communication circuitry is coupled with the sensor circuitry and is configured to communicate the data generated by the sensor circuitry externally of the remote communications device using the wireless communication signals, and wherein the communicated data comprises data sampled according to a first rate during a first period of time and sampled according to a second rate different than the first rate during a second period of time.

According to yet another aspect of the invention, a remote communications device comprises communication circuitry configured to communicate wireless communication signals externally of the remote communications device, sensor circuitry configured to sense at least one condition with respect to the remote communications device and to generate data indicative of the at least one sensed condition, and wherein the communication circuitry is coupled with the sensor circuitry and is configured to communicate the data generated by the sensor circuitry externally of the remote communications device using the wireless communication signals at a plurality of different moments in time determined independently of wireless communication signals received within the remote communications device.

According to still another aspect of the invention, a wireless communications system comprises a reader configured to receive wireless communication signals comprising data generated externally of the reader and a plurality of remote communications devices configured to output the wireless communication signals, wherein the remote communications devices are individually configured to sense at least one condition with respect to the respective remote communications device and to communicate data corresponding to the at least one sensed condition at a plurality of moments in time responsive to criteria originating within the respective remote communications device.

According to an additional aspect of the invention, a wireless communications method comprises sensing a condition with respect to a remote communications device at a plurality of first moments in time, providing data regarding the sensed condition at the first moments in time, outputting a plurality of wireless communication signals using the remote communications device, receiving the wireless communication signals using a reader, and using the wireless communication signals, communicating the data externally of the remote communications device at a plurality of second moments in time determined according to criteria independent of operations of the reader.

According to still yet another aspect of the invention, a wireless communications method comprises sensing a condition with respect to a remote communications device at a plurality of moments in time, providing data regarding the sensed condition at the moments in time, providing a timing reference having a period, outputting a plurality of wireless communication signals using the remote communications device, and using the wireless communication signals, periodically outputting the data regarding the sensed condition at a plurality of moments in time determined according to the period.

Figure 1:
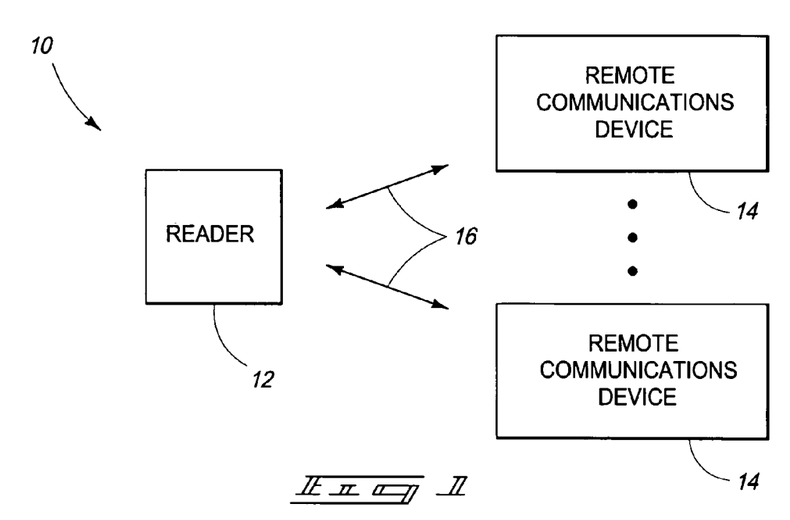
FIG. 1 is a functional block diagram of a wireless communications system according to one embodiment.

Referring to FIG. 1, an exemplary wireless communications system 10 is depicted. The exemplary system 10 includes a first communications device 12 and one or more second communications device 14. First and second communications devices 12, 14 are arranged to implement wireless communications 16 in the depicted exemplary embodiment. Possible wireless communications 16 include first (e.g., uplink) wireless communication signals communicated from first communication device 12 and second (e.g., downlink) wireless communication signals communicated from the one or more second communication device 14.

Wireless communication signals include signals which at some point in time are communicated over a wireless medium but may also be communicated over an electrical conductor (e.g., electrical signals within devices 12, 14) at other moments in time. Exemplary wireless communications 16 include electromagnetic energy or signals, such as radio frequency signals. Alternatively, wireless communications 16 may comprise infrared signals, acoustic signals, or any other appropriate signals capable of being wirelessly communicated between devices 12, 14.

Wireless communication signals may also be referred to as data signals including encoded digital information or data to be communicated intermediate devices 12, 14. Device 14 may be configured to provide wireless communications using a carrier frequency of 303-450 MHz which may be selectable by external components in one arrangement. Also, device 14 may be configured to output communications having a power range between one microWatt and one milliWatt in exemplary configurations. In other embodiments, other communication frequencies and/or power may be utilized.

System 10 is provided to illustrate exemplary structural aspects and methodical aspects of the present invention. In one exemplary embodiment, system 10 is configured to implement identification operations, such as remote communications devices 14 communicating identifiers which may operate to identify (e.g., uniquely) respective ones of the devices 14 communicating the signals. Exemplary identifiers may comprise between 4 and 32 bits (assigned either by hardware and/or software) and be communicated within wireless communication signals comprising data discussed further below in at least one embodiment. In addition, synchronization bits, and other appropriate header and trailer data may also be communicated in wireless communications outputted from devices 14. Data communicated via wireless communications intermediate devices 12, 14 may be encrypted in some embodiments.

In one possible identification implementation, system 10 is implemented as a radio frequency identification device (RFID) communications system. For example, in such an arrangement, first communication device 12 may be implemented as a reader as shown in FIG. 1 and second or remote communications devices 14 may be implemented as transponders, such as RFID tags which operate to communicate in response to interrogation signals from device 12. In another embodiment, remote communications devices 14 may comprise beacons. Exemplary devices 14 configured as beacons are not arranged to process communications from device 12 but merely formulate and output communications to device 12. In an identification implementation, devices 14 may be associated with respective articles (not shown) to implement identification operations of the articles and/or devices 14.

First communication device 12 implemented as a reader may output wireless communication signals for communication to devices 14. The signals outputted from device 12 may comprise commands and/or identifiers to identify one or more of remote communications device(s) 14 intended to receive the respective signals. Device 12 may also output radio frequency energy, such as a continuous wave signal, which may be backscattered by one or more receiving device(s) 14 for implementing backscatter communications from device(s) 14 to device 12 in one embodiment.

Figure 2:
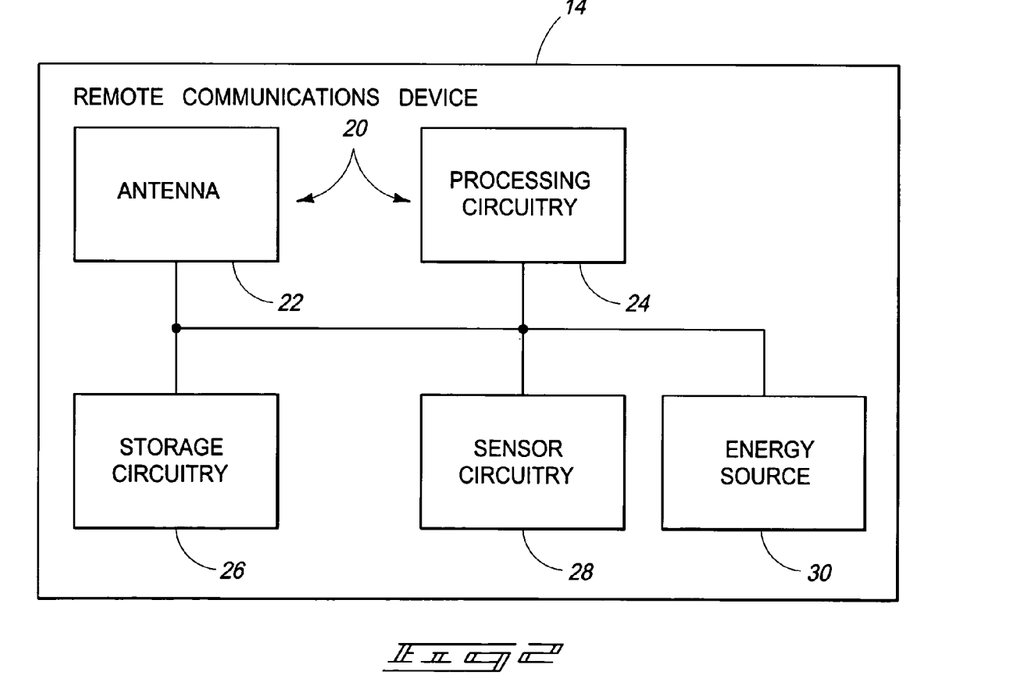
FIG. 2 is a functional block diagram of a remote communications device according to one embodiment.

Referring to FIG. 2, an exemplary arrangement of communication device 14 is shown. The depicted device 14 includes communication circuitry 20 (comprising an antenna 22 and processing circuitry 24 in the illustrated embodiment), storage circuitry 26, sensor circuitry 28 and an energy source 30.

Communication circuitry 20 is configured to formulate, control and communicate wireless signals externally of device 14. As described below, the communication circuitry 20 may monitor status of sensor circuitry 28, control operations of sensor circuitry 28 (and other operations of device 14) and control communications of wireless signals externally of device 14 and comprising data extracted from the sensor circuitry 28.

In some arrangements (e.g., other than beacon configurations), communication circuitry 20 is also configured to process wireless signals which are received by the device 14. For example, the communication circuitry 20 may extract commands from received communications, process the commands, and implement appropriate action if desired.

Antenna 22 may be arranged to communicate (receive and transmit) electromagnetic energy of bi-directional wireless communication signals. Antenna 22 may comprise a single antenna for communication of signals or include a plurality of respective dedicated receive and transmit antennas for communication of respective bi-directional signals. Alternatively, antenna 22 may be implemented to only transmit or receive wireless signals.

In one embodiment, processing circuitry 24 may comprise circuitry configured to implement desired programming. For example, the processing circuitry 24 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry are for illustration and other configurations are possible.

Processing circuitry 24 may be configured to control communications and other operations of device 14. For example, processing circuitry 24 of communication circuitry 20 may be arranged to process received wireless communication signals and to control the formulation and communication of outputted wireless communication signals 20. Processing circuitry 24 may also be utilized to implement other operations of device 14, such as monitoring sensor circuitry 28, controlling the storage of data from sensor circuitry 28 using storage circuitry 26, and/or provision of data from storage circuitry 26 within signals for communications externally of device 14. Sensors of sensor circuitry 28 may be coupled with one or more I/O port of a processor (e.g., FIGS. 3A-3B) of processing circuitry 24.

Communication circuitry 20 arranged to implement RFID communications may be referred to as radio frequency identification device communication circuitry. Communication circuitry 20 may be operable to control communication of wireless communication signals from device 14 responsive to processing of one or more wireless communication signal from device 12. For example, circuitry 20 may implement transponder communications in one exemplary embodiment. Other configurations (e.g., beacon) may utilize unidirectional communications as mentioned above.

Storage circuitry 26 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information. Storage circuitry 26 may be configured to store data compiled from sensor circuitry 28 (or other source) as described further below.

Sensor circuitry 28 is configured to generate data regarding one or more sensed conditions. In one embodiment, sensor circuitry 28 may comprise one or more sensor individually configured to sense a condition with respect to device 14. For example, a sensor may be configured to sense an environmental condition about the sensor of the device 14, such as the environment in which the device 14 resides. Sensor circuitry 28 may also be configured to sense a status condition of device 14 or other conditions which may be monitored with respect to device 14.

Accordingly, exemplary sensors of circuitry 28 are configured to sense one or more condition of an environment about the device 14, a status condition of device 14, or other conditions capable of being monitored by electrical circuitry. Exemplary environmental sensors include a temperature sensor configured to sense temperature, a humidity sensor configured to sense humidity, an electric and/or magnetic field sensor, a gas concentration sensor (e.g., carbon dioxide, methane, gasoline, water vapor, etc.), a chemical toxicant and/or biological pathogen sensor (e.g., aerosol or liquid borne), a proximity detector, a radioactive sensor, etc.

Exemplary sensors of status conditions of device 14 include a tilt sensor configured to sense tilt of device 14 with respect to a reference plane, a voltage sensor configured to sense a voltage of a battery (if present) of device 14, a continuity sensor configured to sense electrical continuity of a respective circuit (e.g., security loop via DC continuity or AC impedance change), a shock sensor, a vibration sensor, acceleration sensor, a direction sensor, a radio active material sensor, etc. Other configurations may be provided in other embodiments to implement sensing of other environmental conditions, other device status conditions, or other types of conditions with respect to device 14 and capable of being monitored by an appropriate sensor.

Energy source 30 is configured to supply operational electrical energy to appropriate components (antenna 22, processing circuitry 24, storage circuitry 26 and/or sensor circuitry 28) of device 14. Energy source 30 may comprise one or more of a plurality of different configurations corresponding to the implementation of communication device 14. For example, communication device 14 may be implemented in passive, semi-passive or active configurations in exemplary arrangements.

In semi-passive implementations, the energy source 30 may comprise a battery utilized to provide electrical energy to circuitry of device 14 while electromagnetic energy received within device 14 may be utilized to generate wireless communication signals outputted from device 14. For example, communication circuitry 20 may implement backscatter modulation of received RF energy to output wireless communication signals in one embodiment.

For active implementations, energy source 30 may also comprise a battery arranged to provide operational electrical energy to circuitry of device 14 similar to the described semi-passive implementation. In addition, the energy source 30 comprising a battery may also be utilized to generate radio frequency energy for communication of wireless signals outputted by device 14.

For passive implementations of device 14, received electromagnetic energy (e.g., radio frequency energy) is utilized to provide operational electrical energy to circuitry of device 14. Further, the communication circuitry 20 may backscatter radio frequency energy for communication of wireless signals outputted from device 14. In such an implementation, the energy source 30 may comprise a power antenna (not shown) and discrete components (e.g., rectifier, voltage doubler, etc.) arranged to convert received electromagnetic energy into usable operational electrical energy.

Exemplary batteries of energy source 30 include a coin cell battery, thin flexible one time use battery, or a rechargeable battery which may be recharged by scavenged RF power, light power, changing magnetic fields, acceleration, gravity or mechanical arrangements.

According to one exemplary arrangement, communication devices 12, 14 are configured to communicate wireless signals using on/off key (OOK) modulation and the biphase space (FM0) or biphase mark (FM1) encoding schemes. Other types of modulation and encoding schemes may be utilized to communicate information between devices 12, 14. For example, in one embodiment, the communications protocol of device 14 may be altered via software and/or firmware to allow compatibility with selected or multiple devices 12.

In at least one embodiment, remote communications device 14 is configured to monitor at least one condition with respect to device 14 (e.g., environment, status, etc.), generate data responsive to the monitoring and indicative of the sensed condition(s), and to control communication of the data externally of device 14 using wireless communication signals in one embodiment. In one exemplary identification embodiment, remote communications device 14 may include an identifier in communicated signals along with the data being communicated. The identifier may uniquely or otherwise identify the respective device 14 communicating the data. The described exemplary configuration of device 14 may communicate RF content comprising an ID number and a status code in one embodiment. The status may comprises data of I/O ports of a processor of processing circuitry 24 generated by one or more sensor of sensor circuitry 28 and indicative of one or more sensed conditions.

In one embodiment, device 14 is configured to determine appropriate moments in time for extracting or generating sensed data from one or more of the sensors and/or for communicating the sensed data externally of the device 14 to device 12. According to at least one embodiment, the determined moments in time may control timing of one or both of data acquisition from the sensor(s) and/or communication of the sensed data externally of the device 14. Different criteria may be utilized to determine the appropriate moments in time for respective ones of data acquisition and communication of the sensed data externally of the device 14 in at least one embodiment. In another embodiment, the same criteria may be used to determine common moments in time for controlling both data acquisition and communications (e.g., communications of real-time sampled data at the determined moments in time).

According to appropriate determined moments in time, processing circuitry 24 may control the acquisition and/or compilation of the data from one or more sensor(s) of sensor circuitry 28 as mentioned above. Processing circuitry 24 may selectively enable (e.g., control the application of power) to one or more appropriate sensor to provide data according to the appropriate moments in time. In another embodiment, sensor(s) of sensor circuitry 28 may be continually sensing and processing circuitry 24 may control the storage of data from the sensor(s) according to the appropriate moments in time. Other methods may be used to generate and store data from sensor circuitry 28.

Also according to appropriate determined moments in time, processing circuitry 24 may control communication of the data externally of device 14 using appropriate wireless communication signals as also mentioned above. For example, data acquired from sensor circuitry 28 may be stored using storage circuitry 24 and thereafter communicated externally of device 14 at the appropriate moments in time. Accordingly, in one embodiment, device 14 is configured to compile data from sensor circuitry 28 during a first period of time and thereafter communicate the data during a second period of time after the first period of time.

In one exemplary implementation, the device 14 may determine the appropriate moments in time independent of actions of device 12, such as independent of communications from device 12. For example, device 14 may determine the appropriate moments in time based upon criteria originating within device 14 according to one embodiment.

For example, in one embodiment, individual devices 14 may generate or utilize respective timing references configured to provide criteria for generating at least some of the appropriate moments in time; According to another embodiment, criteria including triggering events may be utilized alone or in combination with the timing references to determine the appropriate moments in time. Other criteria apart from timing reference determination and/or triggering events may be used in other embodiments for providing the appropriate moments in time.

In one embodiment, the above-described timing reference may comprise a periodic signal having a substantially constant period. Processing circuitry 24 may be programmed to periodically compile data from one or more sensor(s) of sensor circuitry 28 using the timing reference and/or to periodically communicate the data externally of device 14 using the timing reference. Processing circuitry 24 may be programmed in one configuration to control the period between outputted communications to be in the range from one second to one hour (or other period if desired). In one implementation, a plurality of periods may also be utilized to: control compilation of data from sensor circuitry 28 and/or external communication of the data as discussed further below.

According to another aspect, criteria such as triggering events may also be used to control, modify or alter operations of device 14 including changing the methodology for determining one or more of the appropriate moments in time in one example. Exemplary triggering events may be detected by one or more of sensor(s) of sensor circuitry 28 monitoring a respective condition and detecting a triggering event if a threshold of the respective condition being monitored is tripped or triggered in one operational example. Exemplary triggering events may include establishing or breaking electrical circuit continuity; detecting out-of-range conditions, detecting exceeding of threshold conditions, or other criteria corresponding to other conditions being monitored.

Following the detection of a triggering event, processing circuitry 24 may alter the process for the determination of the moments in time for data acquisition from sensor circuitry 28 and/or implementation of external communication of the acquired data. For example, in one embodiment, data may be compiled and stored according to a first rate (e.g., periodic) at a first moment in time before a triggering event is detected. Following the detection of a triggering event, the processing circuitry 24 may control the compilation of data according to a second rate (e.g., also periodic with an increased or decreased frequency compared with the first rate). In addition or alternatively, the processing circuitry 24 may adjust the communication of data externally of device 14 following the detection of a triggering event (e.g., increase or decrease the frequency).

In some embodiments, detection of triggering events may also be utilized to modify or alter other respective operations of device 14. For example, data compilation and/or external communications may be either ceased and/or commenced responsive to the detection of a triggering event in one arrangement.

In another embodiment, modes of operation of one or more component of device 14 may be altered responsive to the detection of a triggering event. For example, one or more components of device 14 may be selectively operable between different modes of operation. In one arrangement, processing circuitry 24 and/or one or more sensors of sensor circuitry 28 may be individually operable between a first mode and a second mode having different rates of power consumption (e.g., a sleep mode to conserve power and a normal mode). In one embodiment, the communication circuitry 20 may be configured to implement communications in the normal mode but not the sleep mode to reduce power consumption during the sleep mode. Following the detection of a triggering event, the mode of operation of one or more components may be changed responsive to control by processing circuitry 24, hardware or other circuitry in exemplary configurations. In other embodiments, a received RF signal, mechanical switch, I/O port interrupt and/or other event may be used to control the mode of operation of one or more components of device 14.

Figure 3:
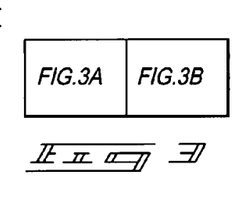
Figure 3A:
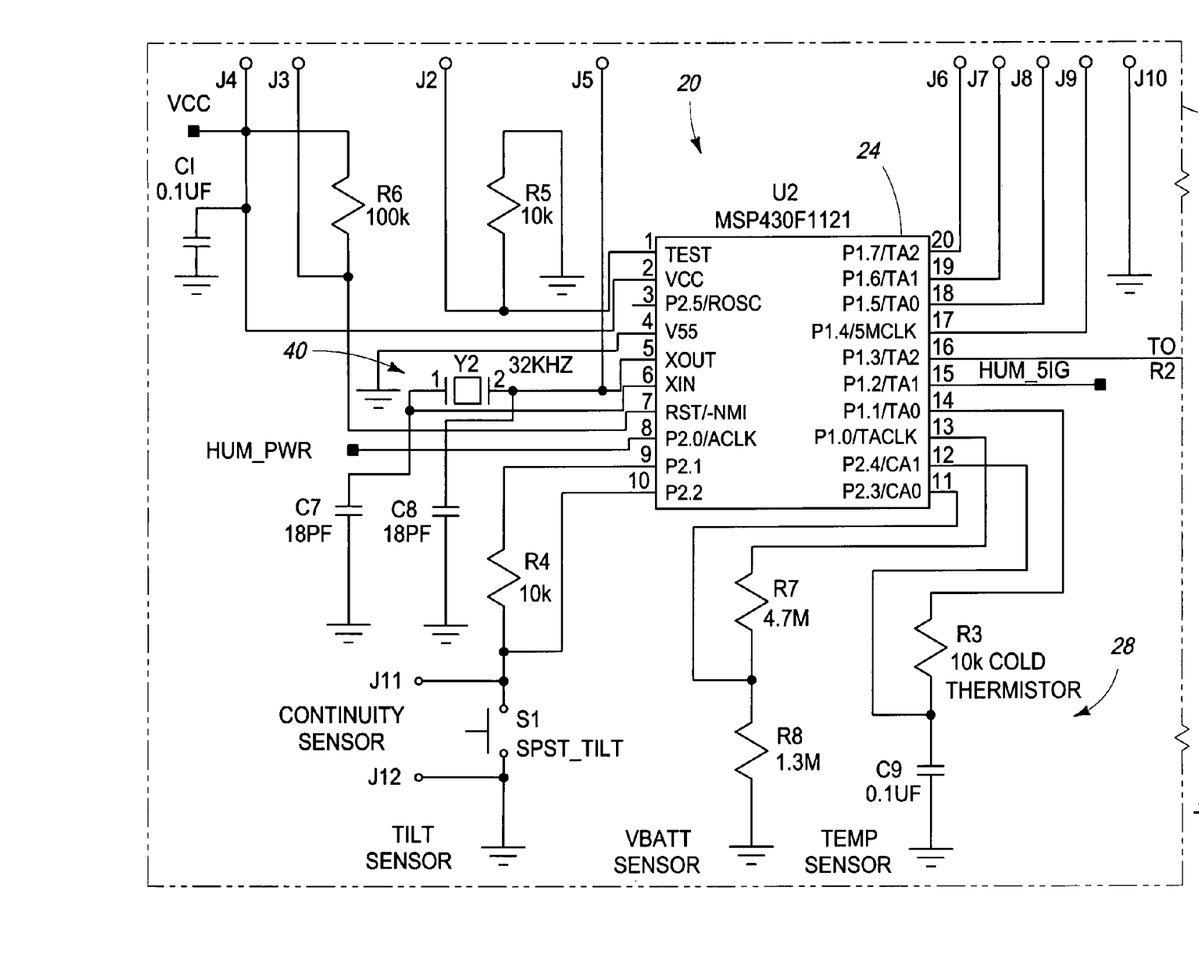
FIGS. 3A-3B when assembled are a schematic diagram of exemplary circuitry of a remote communications device according to one embodiment.
Figure 3B:
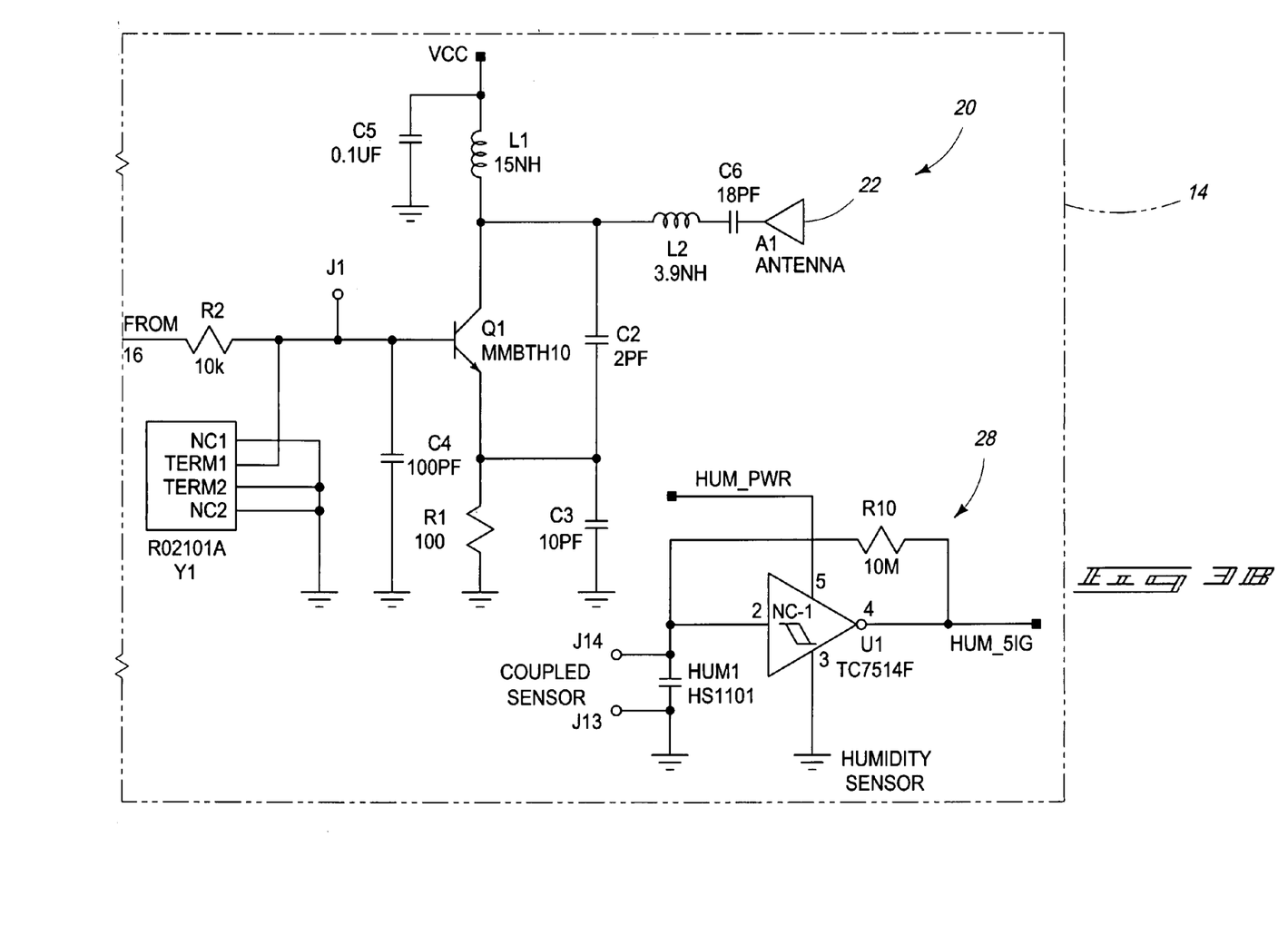

Referring to FIGS. 3A-3B, an exemplary configuration of device 14 is shown. The exemplary circuits of FIGS. 3A-3B may be assembled on a thin ridged or flexible substrate in exemplary implementations.

As shown, the exemplary sensor circuitry 28 of remote communications device 14 depicted in FIGS. 3A-3B may comprise a temperature sensor, battery voltage sensor, tilt sensor, continuity sensor and humidity sensor. Other configurations of sensor circuitry 28 are possible.

Device 14 also includes an oscillator 40 arranged to provide a reference signal having a frequency of approximately 32 kHz and a substantially constant period in the depicted example. Processor 24 may also perform divide operations of the reference signal to provide other frequencies and periods.

Remote communications device 14 of FIGS. 3A-3B comprises a beacon device wherein antenna 22 is only configured to output wireless communication signals for communication to device 12. Bi-directional communications may be provided in other embodiments as described above.

According to the exemplary embodiment of FIGS. 3A-3B, component R02101A is a Surface Acoustic Wave (SAW) resonator which operates to stabilize oscillation frequency over time, temperature and/or battery voltage variations. Processing circuitry 24 is implemented as a MSP430F1121 device in the illustrated configuration and includes 256 bytes of RAM (i.e., temporary memory) and 256 bytes of programmable flash information memory (i.e., writable permanent memory). Configuration information of device 14 (e.g., unique identification number of device 14) may be stored within the flash memory and data to be communicated to reader 12 or other destination may be stored with the RAM memory in but one arrangement. Information stored within the flash memory may be retained during periods of loss of power to device 14 (e.g., when batteries are being replaced or at other moments in time when sufficient operational power is absent).

The carrier frequency used for transmission by device 14 is controlled by components Q1, L1, C2 and C3 in the illustrated exemplary embodiment. More specifically, L1, C2 and C3 and the load composed of the antenna and the impedance matching circuitry of L2 and C6 set the oscillation frequency of device 14. Transistor Q1 is biased ON whenever pin 16 of processing circuitry 24 is high which controls generation of the oscillation. Resistors R1 and R2 set the transmit power of device 14 by setting the amount of bias current passing through transistor Q1. Other implementations of device 14 are possible in other embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A remote communications device comprising:
   communication circuitry configured to communicate wireless communication signals externally of the remote communications device;
   sensor circuitry configured to sense at least one condition with respect to the remote communications device;
   wherein the communication circuitry is coupled with the sensor circuitry and is configured to determine a plurality of different moments in time responsive to criteria originating within the remote communications device and to communicate data indicative of the at least one sensed condition externally of the remote communications device to a reader using the wireless communication signals at the different moments in time; and
   wherein the communication circuitry is configured to determine some of the moments in time according to a first rate during a first period of time and to determine others of the moments in time according to a second rate during a second period of time, and the first and second rates are different.

2. The device of claim 1 wherein the communications circuitry is configured to implement radio frequency identification device communications.

3. The device of claim 1 wherein the data is communicated at the different moments in time independent of communications from the reader.

4. The device of claim 1 wherein the communication circuitry is configured to determine the different moments in time according to a plurality of different periods.

5. The device of claim 1 wherein the communication circuitry is configured to communicate an identifier of the device with the data.

6. The device of claim 1 wherein the at least one condition is sensed during a first period of time and the communication circuitry is configured to communicate the data at a second period of time.

7. The device of claim 1 wherein the sensor circuitry is configured to detect a triggering event, and wherein the communication circuitry is configured to commence the communication of the data responsive to the detection.

8. The device of claim 1 wherein the sensor circuitry is configured to detect a triggering event, and wherein generation of the data indicative of the at least one sensed condition is commenced responsive to the detection.

9. The device of claim 1 wherein the sensor circuitry is configured to detect a triggering event, and wherein the data is generated according to a third rate before the triggering event and a fourth rate different than the third rate after the triggering event.

10. The device of claim 1 wherein the communication circuitry is configured to:
    initiate operations of the remote communications device in a first mode at a first moment in time;
    detect a triggering event; and
    initiate operations of the remote communications device in a second mode having increased power consumption compared with the first mode at a second moment in time and responsive to the detection, wherein the communication circuitry is configured to communicate the data during the second mode.

11. The device of claim 10 wherein processing circuitry of the communication circuitry is operable between the first and the second modes.

12. The device of claim 10 wherein the sensor circuitry is operable between the first and the second modes.

13. The device of claim 1 further comprising an energy source configured to supply operational energy to the communication circuitry.

14. The device of claim 1 wherein the device comprises a beacon and the communication circuitry is incapable of processing wireless communications received by the remote communications device.

15. The device of claim 1 wherein the wireless communication signals comprise a plurality of transmitted wireless communication signals which are outputted from the remote communications device, and the communication circuitry is configured to receive and to process a plurality of received wireless communication signals which are received by the remote communications device.

16. A remote communications device comprising:
    communication circuitry configured to communicate wireless communication signals externally of the remote communications device;
    sensor circuitry configured to sense at least one condition with respect to the remote communications device and to generate data indicative of the at least one sensed condition; and
    wherein the communication circuitry is coupled with the sensor circuitry and is configured to communicate the data generated by the sensor circuitry externally of the remote communications device using the wireless communication signals, and wherein the communicated data comprises data sampled according to a first rate during a first period of time and sampled according to a second rate different than the first rate during a second period of time.

17. The device of claim 16 wherein the communication circuitry is configured to monitor for a presence of a triggering event and to change the sampling from the first rate to the second rate responsive to the presence of the triggering event.

18. The device of claim 16 wherein the communication circuitry is configured to periodically communicate the data.

19. The device of claim 16 wherein the communication circuitry is configured to periodically communicate the data according to different periods during the first and second periods of time.

20. The device of claim 16 wherein the first and the second rates are periodic.

21. The device of claim 16 wherein the sensor circuitry is configured to sense the at least one condition comprising a plurality of conditions including humidity of an environment about the remote communications device, temperature of an environment about the remote communications device, tilt of the remote communications device, and electrical continuity of a circuit associated with the remote communications device.

22. The device of claim 16 wherein the wireless communication signals comprise a plurality of transmitted wireless communication signals which are outputted from the remote communications device, and the communication circuitry is configured to receive and to process a plurality of received wireless communication signals which are received by the remote communications device.

23. A remote communications device comprising:
communication circuitry configured to communicate wireless communication signals;
sensor circuitry configured to sense at least one condition with respect to the remote communications device and to generate data indicative of the at least one sensed condition; and
wherein the communication circuitry is coupled with the sensor circuitry and is configured to receive and to process some of the wireless communication signals and to output the data generated by the sensor circuitry externally of the remote communications device using others of the wireless communication signals at a plurality of different moments in time determined independently of the some of the wireless communication signals received within the remote communications device.

24. The device of claim 23 wherein the communication circuitry is configured to output the data at the different moments in time according to a period.

25. The device of claim 23 wherein the communication circuitry is configured to process the some of the wireless communication signals responsive to the some of the wireless communication signals comprising an identifier which matches an identifier of the remote communications device.

26. A wireless communications system comprising:
a reader configured to receive first wireless communication signals comprising data generated externally of the reader and to output second wireless communication signals; and
a plurality of remote communications devices comprising radio frequency identification devices configured to output the first wireless communication signals and to receive and to process the second wireless communication signals, wherein the remote communications devices are individually configured to sense at least one condition with respect to the respective remote communications device and to communicate data corresponding to the at least one sensed condition at a plurality of moments in time responsive to criteria originating within the respective remote communications device.

27. The system of claim 26 wherein the criteria is a substantially constant period.

28. The system of claim 26 wherein the remote communications devices are configured to detect a triggering event, and wherein the remote communications devices are configured to commence the communication of the data responsive to the detection.

29. The system of claim 26 wherein the remote communications devices are configured to detect a triggering event, and wherein generation of the data indicative at the at least one sensed condition is commenced responsive to the detection.

30. The system of claim 26 wherein the remote communications devices are configured to detect a triggering event, and wherein the remote communications devices are configured to communicate the data obtained according to a first rate before the triggering event and a second rate different than the first rate after the triggering event.

31. The system of claim 26 wherein the remote communications devices are individually configured to communicate the data at the moments in time responsive to the criteria which is independent of the second wireless communication signals of the reader.

32. The system of claim 26 wherein the remote communications devices are individually configured to communicate the data to the reader using the first wireless communication signals.

33. The system of claim 26 wherein the remote communication devices are configured to process the second wireless communication signals responsive to identifiers of the second wireless communication signals matching identifiers of respective ones of the remote communications devices.

34. A wireless communications method comprising:
sensing a condition with respect to a remote communications device at a plurality of first moments in time;
providing data regarding the sensed condition at the first moments in time;
outputting a plurality of first wireless communication signals using the remote communications device;
receiving the first wireless communication signals using a reader;
outputting a plurality of second wireless communication signals using the reader;
receiving and processing the second wireless communication signals using the remote communications device; and
using the first wireless communication signals, communicating the data externally of the remote communications device at a plurality of second moments in time determined according to criteria independent of operations of the reader.

35. The method of claim 34 wherein the plurality of second moments in time are determined using criteria originating using the remote communications device.

36. The method of claim 34 wherein the first moments in time are periodic.

37. The method of claim 34 wherein the second moments in time are periodic.

38. The method of claim 34 wherein the second wireless communications signals comprise an identifier of the remote communications device.

39. The method of claim 34 wherein the second moments in time are determined independent of the second wireless communication signals received from the reader.

40. The method of claim 34 further comprising:
detecting a triggering event; and
changing a rate of the sensing responsive to the detecting.

41. The method of claim 34 further comprising:
detecting a triggering event; and
changing a rate of the communicating responsive to the detecting.

42. The method of claim 34 wherein the remote communications device comprises a radio frequency identification device transponder.

43. The method of claim 34 wherein the processing the second wireless communication signals comprises processing the second wireless communication signals responsive to the second wireless communication signals comprising identifiers which match an identifier of the remote communications device.

44. A wireless communications method comprising:
sensing a condition with respect to a remote communications device at a plurality of moments in time;
providing data regarding the sensed condition at the moments in time;
outputting a plurality of wireless communication signals using the remote communications device;
using the wireless communication signals, outputting the data regarding the sensed condition at a plurality of moments in time; and
adjusting a number of times the condition is sensed with respect to time.

45. The method of claim 44 further comprising receiving the wireless communication signals using a reader.

46. The method of claim 44 further comprising:
detecting a triggering event; and
changing a rate of the sensing responsive to the detecting.

47. The method of claim 44 further comprising:
detecting a triggering event; and
changing a rate of the outputting of the data responsive to the detecting.

48. The method of claim 44 wherein the wireless communication signals comprise an identifier which uniquely identifies the remote communications device.

49. The method of claim 44 wherein the outputting comprises outputting independent of communications of a reader.

50. The method of claim 44 wherein the wireless communication signals comprise a plurality of transmitted signals, and further comprising receiving and processing a plurality of additional wireless communication signals using the remote communications device.

51. A remote communications device comprising:
communication circuitry configured to communicate wireless communication signals externally of the remote communications device;
sensor circuitry configured to sense at least one condition with respect to the remote communications device;
wherein the communication circuitry is coupled with the sensor circuitry and is configured to determine a plurality of different moments in time responsive to criteria originating within the remote communications device and to communicate data indicative of the at least one sensed condition externally of the remote communications device to a reader using the wireless communication signals at the different moments in time; and
wherein the communication circuitry is configured to:
initiate operations of the remote communications device in a first mode at a first moment in time;
detect a triggering event; and
initiate operations of the remote communications device in a second mode having increased power consumption compared with the first mode at a second moment in time and responsive to the detection, wherein the communication circuitry is configured to communicate the data during the second mode.

52. The device of claim 51 wherein processing circuitry of the communication circuitry is operable between the first and the second modes.

53. The device claim 51 wherein the sensor circuitry is operable between the first and the second modes.

* * * * *

UNITED STATES PATENT AND TRADEMARK OFFICE
CERTIFICATE OF CORRECTION

PATENT NO. : 7,317,382 B2
APPLICATION NO. : 11/011316
DATED : January 8, 2008
INVENTOR(S) : Pratt et al.

Page 1 of 1

It is certified that error appears in the above-identified patent and that said Letters Patent is hereby corrected as shown below:

Col. 7, line 33, please delete "time;" after "in" and insert --time.--.

Col. 7, line 51, pleaser delete "to:" before "control" and insert --to--.

Col. 7, line 64, please delete "continuity;" after "circuit" and insert --continuity,--.

Col. 12, line 13, claim 29, please delete "at" after "indicative" and insert --of--.

Signed and Sealed this

Second Day of September, 2008

JON W. DUDAS
*Director of the United States Patent and Trademark Office*